Sept. 25, 1962  R. O. PROBST  3,055,592
LIQUID ATOMIZING APPARATUS
Filed Dec. 17, 1956  2 Sheets-Sheet 1
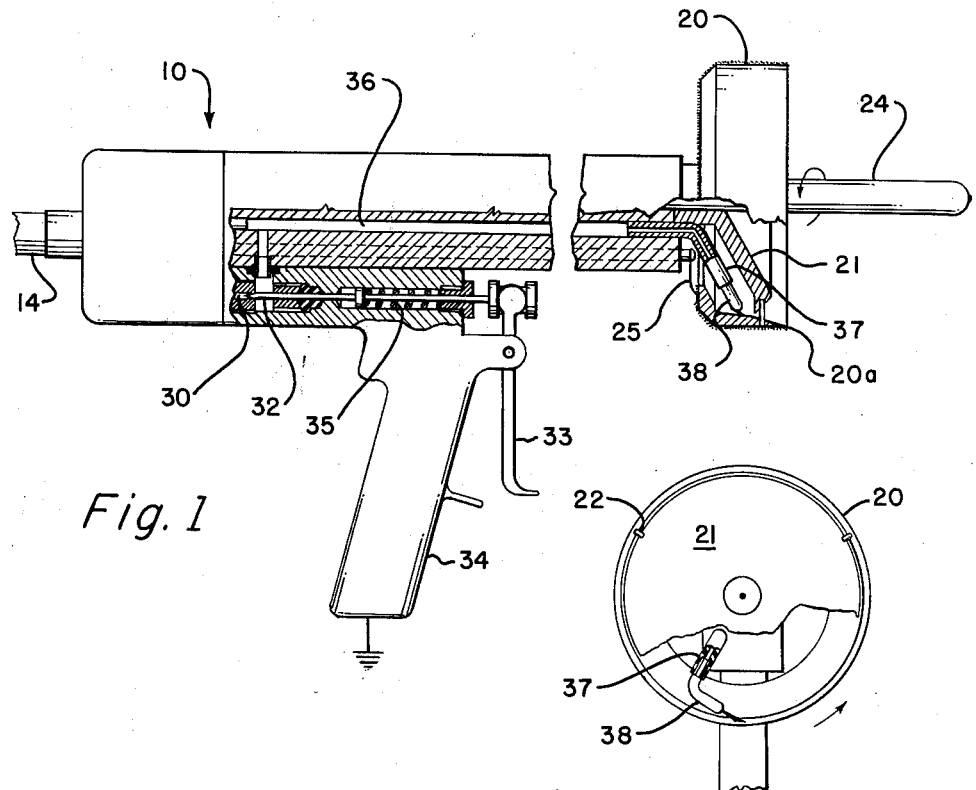
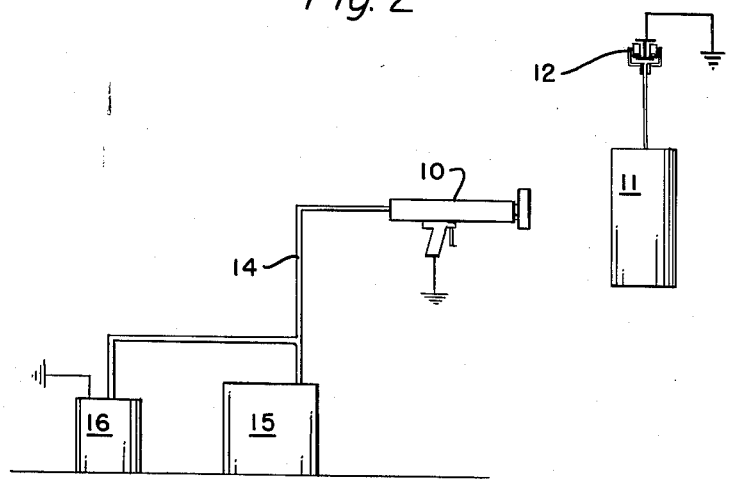
INVENTOR.
RICHARD O. PROBST
BY
Attorneys

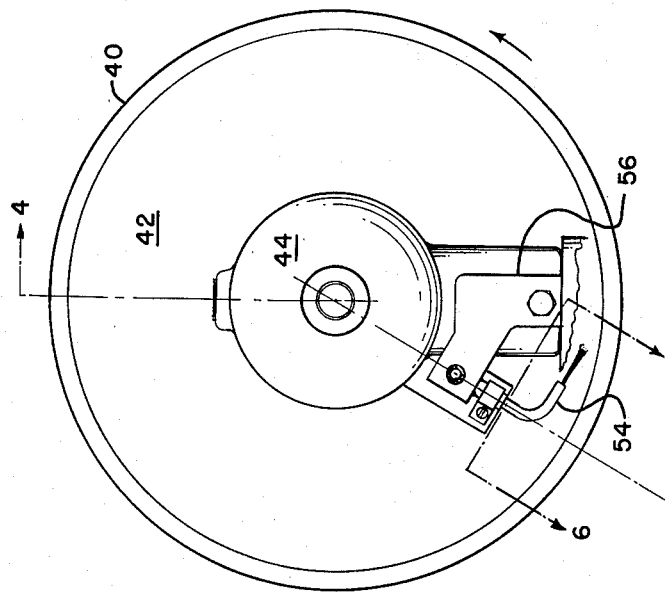
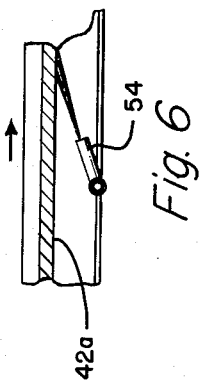
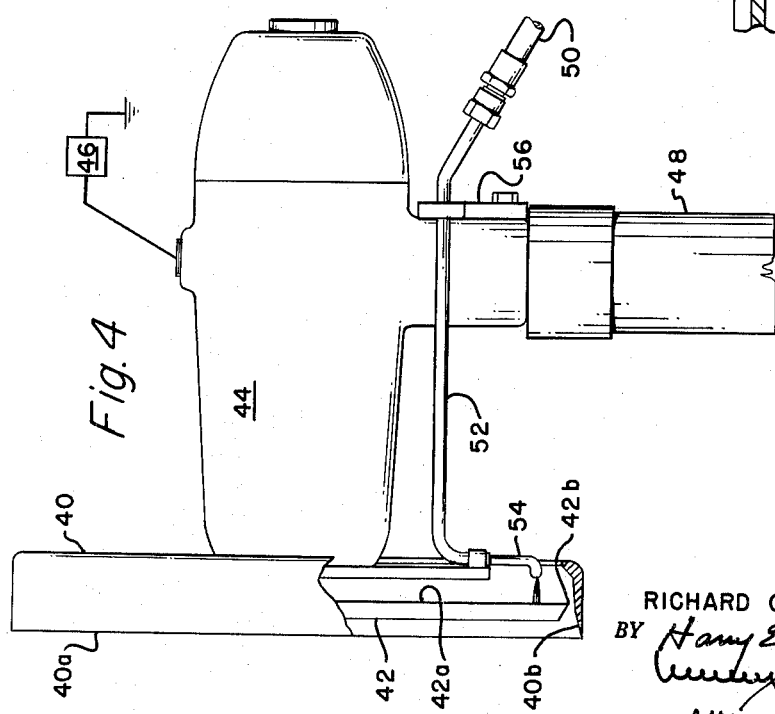

United States Patent Office 3,055,592
Patented Sept. 25, 1962

3,055,592
LIQUID ATOMIZING APPARATUS
Richard O. Probst, Indianapolis, Ind., assignor to Ransburg Electro-Coating Corp., Indianapolis, Ind., a corporation of Indiana
Filed Dec. 17, 1956, Ser. No. 628,805
5 Claims. (Cl. 239—15)

My invention relates to improvements in apparatus in which liquid is fed to the surface of a member for atomization therefrom.

The atomization of liquid from a rotating member for various purposes is well known. One example is the electrostatic spray coating of articles wherein liquid coating material is fed from a stationary feed tube to a rotating atomizing member for atomization therefrom into an electrostatic field for deposition on the articles to be coated.

It is usually desired to feed liquid to the rotating atomizer in a steady stream and in such manner that the liquid spreads without turbulence to form on a surface of the atomizer a smooth liquid film moving toward the peripheral edge of the atomizer for atomization adjacent such edge. One problem encountered in feeding liquid to certain types of atomizers used in spray coating is "slugging," that is, transference of liquid to the rotating member often tends to produce undesirably large droplets or "slugs" of the liquid which are discharged from the rotating member more or less at random during liquid transference and may be deposited on the articles being coated. Such slugging is objectionable in that the large size of the droplets as well as their random distribution on the articles may cause a commercially unacceptable finish.

Other problems often occur during starting and stopping the flow of liquid from the feed tube onto the rotating member. When feeding is started, there is a tendency for initial quantities of liquid to be thrown or spun off the rotating member. When feeding is stopped, the remaining liquid emerging from the feed tube tends to form a series of discrete drops, rather than a substantially continuous stream, and the drops under the influence of gravity may or may not reach the rotating member. If they do, the individual drops may be spun from the rotating member rather than be retained and formed into a liquid film. Also when feeding is stopped and the feed tube is directed generally upwardly, the liquid last emerging from the feed tube may run back over the outside of the tube rather than reach the rotating member.

My invention is directed to means for feeding liquid from a tube or nozzle onto a surface, particularly the rotating surface of an atomizer, in a smooth, steady flow and without turbulence, slugging or other undesirable disturbances particularly during the starting and stopping of liquid flow. I have discovered that liquid feeding from a stationary nozzle to a member can be markedly improved so as to eliminate unwanted turbulence and slugging if a proper electrical potential difference is maintained between the liquid as it emerges from the nozzle and the surface onto which the liquid is to impinge so as to create an electrical attraction between such liquid and the surface. By electrical attraction I mean that the nozzle is maintained at an electrical potential sufficiently different from that of the liquid-receiving surface to affect the direction of travel of the liquid discharged from the nozzle and to increase the affinity of the liquid for the surface.

I have also found certain particular physical relationships between a stationary feed tube and a rotating atomizer surface aid in preventing slugging, such as positioning the feed tube so that liquid is projected onto a surface of the rotating atomizer substantially in the direction of its rotation. It is also desirable to have the discharge end of the liquid feed tube located quite close, as in the order of a fraction of an inch, to the surface onto which the liquid is discharged. These and other physical relationships are of particular importance in feeding liquid peripherally, that is, closer to the peripheral edge than to the center of a rotating member, when the member has a diameter of more than an inch and is rotated at speeds of several hundreds of revolutions per minute or more.

In order to maintain the desired electrical potential difference between the liquid as it is discharged from the tube and the surface of the atomizer, I have found it convenient to electrically isolate the liquid feed tube and its associated liquid supply means from other elements of the system and particularly from the atomizer edge which is conventionally maintained by appropriate electrical connection at a high potential. Thus, when no paint is being fed to the atomizer, the feed tube will asume a potential different from that of the atomizer by virtue of its position in the electrical system. The essential elements of this electrical system are the charged atomizer, the air gap between the atomizer and the feed tube, the feed tube itself and the column of paint from the feed tube to ground. These elements, in effect, comprise a rather complicated resistive voltage dividing network.

Liquid coating materials and their solvents vary as to their electrical conductivity, but most commercial paints are sufficiently non-conductive so that when an unbroken stream of paint is flowing from the feed tube to the atomizer surface the potential difference between paint at the tube end and the atomizer will normally be adequate to create the desired electrical attraction between the liquid and the atomizer surface to eliminate turbulence and slugging otherwise generated by the liquid transference. Of course, if desired the feed tube can be maintained at a potential different from the atomizer by directly connecting the tube to a source of such potential, or through a voltage dividing resistor to the source of atomizer potential.

An object of my invention is to eliminate turbulence, slugging and other undesirable phenomena occurring in the transfer of liquid from a stationary tube to a rotating member, particularly during starting and stopping of liquid flow.

Another object is to provide improved apparatus for liquid feeding and atomizing, particularly apparatus suitable for electrostatic spray coating.

Apparatus for achieving the foregoing and other related objects of my invention will now be described in detail and is shown in the accompanying drawings in which:

FIG. 1 is a partially broken away side view of a hand operable electrostatic spray gun utilizing my invention:

FIG. 2 is a broken away front view of the gun shown in FIG. 1;

FIG. 3 is a diagrammatic view of a complete electrostatic coating system with the gun shown in FIG. 1;

FIG. 4 is a partially broken away side view of another embodiment of my invention;

FIG. 5 is a rear view of the apparatus shown in FIG. 4; and

FIG. 6 is a detailed view of a portion of the apparatus shown in FIGS. 4 and 5 taken along line 6—6.

My invention is of particular use in a hand operable electrostatic spray gun such as shown in FIGS. 1–3. A hand operated gun is frequently stopped and started and is used in various positions so that the feeding means must be operable regardless of the position of the gun. When used in the application of high quality finishes to articles of manufacture, continuous uniform feeding, without slugging, must be maintained.

I do not claim as my invention the overall design, features or electrical characteristics of the electrostatic spray gun shown in FIGS. 1–3 as my invention is concerned only with the liquid feeding means therefor and particularly the liquid feed nozzle, the rotatable rim and the physical and electrical relationships therebetween. Generally the gun, designated as 10, is held by an operator in spaced relation to an article 11 (shown in FIG. 3) which may be suspended from a conveyor 12. Gun 10 is connected by a cable 14 to a combined source of rotational power and high voltage 15 and to a supply tank 16 of liquid coating material.

Three separate conduits within cable 14 are used to supply rotational power, high voltage and liquid coating material to the rear portion of gun 10, but since my invention is concerned only with the liquid feeding means for the gun, the details of the rotating means and high voltage supply means will not be here described in detail. Suffice it to say that the gun includes a hoop-like rim 20 preferably made of a highly insulating material such as nylon. Rim 20, in the embodiment shown having a diameter of four inches, is spaced from a dish-like hub 21 and affixed to this hub by means of a plurality of pins 22 (FIG. 2) and the rim is rotated at a speed in the order of several hundred revolutions per minute by rotation of the hub which is attached to a rotatable shaft 24. The rim has an interior liquid-guiding surface terminating in a forward edge 20a maintained at a high electrical potential, which may vary depending upon the spacing between gun 10 and article 11, normally in the order of several tens of thousands of volts by suitable electrical connection of the edge 20a, through a semi-conductive coating on the outside of the rim, a spring 25 in friction contact with the back of the rim, a high resistance (not shown) and cable 14, to the source of high potential 15.

Liquid coating material supplied, preferably under a pressure of a few pounds per square inch, from tank 16 through cable 14 to a passageway 30 is there controlled by a needle valve 32 which is operated by a manual trigger 33 in conjunction with a handle 34 of the gun. Valve 32 is maintained in a normally closed position by means of a spring 35.

Squeezing of trigger 33 causes valve 32 to open and permit liquid to flow upwardly into a passageway 36 which runs axially through the main body of gun 10 which is preferably made of a moulded plastic insulating material. A feed tube extension 37, which may be made of nylon or other insulating material, is pressed onto the end of passageway 36 and a nozzle or feed tube 38, formed as shown and preferably made of copper tubing, is threadedly fitted into the end of extension 37. The internal diameter of extension 37 and tube 38 as well as the size of the opening in the end of tube 38 are designed so that closing of valve 32 will result in discontinuance of flow from the end of tube 36 without appreciable dripping or draining of liquid from the tube.

The distance between the discharge end of feed tube 38 and the liquid-guiding surface of rim 20 (measured radially of the rim) should be in the order of one eighth of an inch. The tube is positioned so as to discharge liquid as a continuous, unbroken jet stream directly onto the interior surface of the rim in a direction generally parallel to the direction of rotation of the rim and at a slight angle to a line tangent to the interior surface. Preferably in most instances the axis of the lowermost portion of the feed tube should be parallel to the plane of rotation, but in some instances it may be advisable to cock the extreme end of the tube back away from edge 20a a few degrees. Such physical relationships between the tube and the rim promote smooth feeding of the liquid.

It will be appreciated that in the absence of liquid discharge from feed tube 38, the tube will be electrically isolated from the electrical circuit supplying high voltage to rim edge 20a, since the tube is not directly connected to voltage source 15. Tube 38 will assume a potential somewhat lower than edge 20a, but well above ground, because of its position in the electrical system. Both the liquid supply tank 16 and the operator of gun 10 are at ground and hence the liquid being fed through passageway 36 will be substantially at ground. When liquid is fed to and discharged from tube 38, the liquid will be at substantially the potential of the tube. The difference of potential between tube 38 and edge 20a, normally in the order of one or more kilovolts, will be sufficient to somewhat alter the direction of travel of the liquid stream and to increase the affinity of the liquid for the rotating rim surface. With such an arrangement, liquid will be fed to the interior surface of rim 20 in an unbroken stream without substantial turbulence or slugging and with markedly improved liquid transference especially on stopping and starting of liquid flow with the gun held for painting in an upward direction.

The actual potential difference between tube 38 and rim 20 existing while paint is being fed in an unbroken stream therebetween will, of course, depend upon the electrical characteristics of the paint itself. Most commercial paints, lacquers, solvents and the like are sufficiently non-conductive so that an adequate potential difference will be maintained between the tube and the rim. Even if the paint is highly conductive, as is the case with certain metallic pigmented paints and some other liquid coating materials, so that the potential difference between the tube and the rim is greatly reduced when a continuous stream of paint is flowing therebetween, an adequate potential difference will exist therebetween during the stopping and starting of paint flow (when the stream is broken up into droplets or the cross sectional dimension of the stream is substantially reduced) which will materially improve the liquid feeding characteristics of the gun.

Turning now to FIGS. 4–6 there is shown an atomizing device suitable for conveyorized production line electrostatic spray painting. This device is in many ways similar in its general construction to the atomizer described above in that it includes a rotatable rim, an inner hub, means for maintaining the rim at high voltage, and a nozzle for feeding liquid coating material to the atomizer for atomization therefrom. Rim 40 is made of metal and is connected by several pins (not shown) to a disc-shaped hub or baffle member 42. This hub is mounted for rotation on the shaft of an electric motor 44, or other suitable source of rotary power, which is connected to a source of high voltage 46. Motor 44 is mounted on a support 48 made of insulating material such as polyester bonded fiber glass.

The atomizing edge 40a of the atomizer is maintained at a potential in the order of 90,000 volts by virtue of its direct connection through hub 42 and motor 44 to voltage source 46. The hub and rim are rotated, as in the order of 900 revolutions per minute, by operation of motor 44. In the embodiment shown rim edge 40a has a diameter of 12 inches, edge 40a is radiused to .005 inch, and the interior liquid-guiding surface 40b of the rim leading to edge 40a was inclined outwardly at an angle to the axis of rotation (and to the cylindrical outer surface of rim 40) of approximately 15°. The rear surface 42a of hub 42 is preferably flat and smooth, lies normal to the axis of rotation of the hub and forms a sharp angled peripheral edge 42b spaced approximately .030 inch from surface 40b of the rim.

Liquid coating material is supplied at an accurately controlled rate to the atomizer from an electrically grounded source, such as a positive displacement pump (not shown), through a supply line 50 to a feed tube 52. An adjustable metal nozzle 54 is connected to the forward end of feed tube 52 and has in its discharge end an orifice whose diameter is approximately 1/16 of an inch. Liquid is fed through supply line 50, feed tube 52 and nozzle 54 under a few pounds of pressure so as to discharge a continuous stream of liquid from the orifice in nozzle 54 onto the rotating hub surface 42a as shown in detail in FIG. 6.

Preferably nozzle 54 is constructed and arranged so that the distance from the orifice to the hub (measured parallel to the axis of rotation of the atomizer) is about ½ inch, and the distance therebetween measured along the axis of the lower end of nozzle 54 is approximately one inch and makes an angle between surface 42a and the axis of the lower portion of tube 54 of approximately 20°, as shown in FIG. 6. Like the device shown in FIGS. 1–3, nozzle 54 is positioned to discharge liquid in a direction generally parallel to the direction of rotation of the surface onto which the liquid will be discharged. The foregoing physical relationships per se have been found to promote smooth feeding of the liquid in operation of the atomizer shown in FIGS. 4–6.

Feed tube 52 is mounted on a bracket 56 made of nylon or other suitable insulating material, which bracket in turn is mounted on support 48. Thus feed tube 52 and nozzle 54 have no direct electrical connection (other than the stream of paint) to the rim, hub and motor which are maintained at high potential. However, prior to paint flow, nozzle 54 will assume a potential somewhat lower than that of the hub and rim but substantially above ground. It has been found that with a ½ inch spacing between nozzle 54 and hub 42 it is desirable to have, during paint flow, a potential difference of from 10 to 12 kilovolts between the nozzle and the hub and at this spacing sparking therebetween is likely to occur if a potential difference of much more than 15 kilovolts exists. If the spacing is reduced to 5/16 of an inch a potential difference of 7 to 9 kilovolts is desirable and the maximum non-sparking potential difference at this spacing is about 11 kilovolts. These values were ascertained by applying a direct separate voltage to nozzle 54 in order to determine the most desirable potential differences at various spacings.

If nozzle 54 is to acquire its potential by virtue of its position in the electrical system in relation to the charged rim and hub, as shown in FIGS. 4–6, it has been found that with a voltage of 90 kilovolts maintained on the atomizer rim and hub and with a spacing of ½ inch between nozzle 54 and hub 42 nozzle 54 will, in the absence of paint flow, assume a potential measured at 78 kilovolts.

With this same arrangement and with a well-known paint (Lily white synthetic baking enamel thinned with xylol to 20 seconds on a Zahn No. 2 cup) fed in a continuous stream between nozzle 54 and hub surface 42a, the measured potential of the nozzle was 76 kilovolts. The resulting potential difference of 14 kilovolts between the nozzle and hub achieved a significant improvement in liquid transference by substantial elimination of slugging and improved transference on stopping and starting of liquid flow. The effect of the electrostatic attraction between the paint and hub was readily visible to the naked eye. Without any electrical potential difference between the nozzle and the atomizer, the paint was discharged onto the surface of the hub at a point about one inch inwardly of hub edge 42*b*, but with a potential difference of 14 kilovolts existing between the nozzle and the atomizer surface the liquid was discharged approximately two inches inwardly of hub edge 42*b*, thus demonstrating the significance of the electrical potential difference in overcoming the effect of gravity.

It is pointed out that care must be taken to prevent direct electrical contact between the liquid and/or its feed tube and the source of potential of the atomizer in order that an effective electrical potential can be maintained between the nozzle and feed tube on the one hand and the liquid receiving surface of the atomizer on the other. For example, if bracket 56 were made of metal, rather than a highly insulating material, an effective potential difference between the nozzle and liquid receiving surface would not exist since the liquid being fed through tube 52 would be raised to a potential substantially above ground even if feed tube 52 were made of a somewhat insulating material.

While having shown and described certain embodiments of my invention; it will be understood that it is capable of various modifications and that changes in construction and arrangement may be made without departing from the spirit and scope of the invention as set forth in the appended claims.

I claim:

1. In apparatus for atomizing liquid material comprising a rotatable atomizing member, means for rotating said member about a central axis, said rotating member having a generally cylindrical internal liquid-guiding surface concentric about said axis of rotation terminating in a projecting annular atomizing edge, and means including a source of high voltage connected to maintain said atomizing edge at an electrical potential different from its surroundings, feed means comprising nozzle means for feeding a stream of liquid material onto said liquid-guiding surface rearwardly of said atomizing edge for atomization therefrom, said nozzle means directing said steam generally parallel to and in the direction of rotation of said surface, and means for maintaining said nozzle means at an electrical potential substantially different from said atomizing member to create an electrical attraction between liquid emerging from said nozzle means and the surface to which liquid is fed.

2. In apparatus for atomizing liquid material comprising a rotatable atomizing member of substantially non-conducting material, means for rotating said member about a central axis, said rotating member having a generally cylindrical internal liquid-guiding surface concentric about said axis of rotation terminating in a projecting annular atomizing edge, and means including a source of high voltage connected to maintain said atomizing edge at an electrical potential different from its surroundings, feed means comprising nozzle means having an orifice diameter of a small fraction of an inch located within a small fraction of an inch of said liquid-guiding surface for feeding a stream of liquid material onto said liquid-guiding surface rearwardly of said atomizing edge for atomization therefrom, said nozzle means directing said stream generally parallel to and in the direction of rotation of said surface, and means for maintaining said nozzle means at an electrical potential of at least one kilovolt from said adjacent surface to create an electrical attraction between liquid emerging from said nozzle means and said adjacent surface.

3. In a manually operable device for atomizing liquid from a forwardly projecting annular edge of a rotating member, apparatus for feeding liquid to said annular edge including an interior liquid-guiding surface on said rotating member leading to said annular edge and concentric therewith, means for maintaining said annular edge and said liquid-guiding surface at a high electrical potential, a stationary small-orificed nozzle supported on said device and lying rearwardly of said annular edge, a liquid feed tube connected to said nozzle for supplying liquid thereto, means for maintaining said nozzle and feed tube at an electrical potential substantially different from the potential of said annular edge and said surface, and a manually operable valve within said device for controlling the flow of liquid to said tube, said nozzle being positioned to jet the liquid onto the liquid-guiding surface with a substantial component in the direction of the path of rotation of said rotating member for flow over said surface as a film moving toward said annular edge.

4. Apparatus for atomizing liquid coating material comprising a rotatable atomizing member having a concentric liquid-guiding surface terminating in an annular atomizing edge, power driven means for rotating said member about its axis, means for feeding a stream of liquid coating material onto a point on said rotating liquid-guiding surface spaced from said atomizing edge for flow over said surface to said edge for atomization therefrom and for abruptly and completely terminating the feeding of liquid coating material to said rotating surface comprising a liquid feed tube having rigid walls, a small-orificed nozzle positioned adjacent to said surface for jetting liquid coating material onto said point on said surface, and a valve for said feed tube rearwardly of said nozzle, the internal cross-sectional area of said tube forwardly of said valve and the size of the orifice in said nozzle being small enough to retain within said tube and nozzle all of the liquid coating material contained therein upon the closing of said valve.

5. In apparatus for atomizing liquid material comprising a rotatable atomizing member, means for rotating said member about a central axis, said rotating member having a liquid-guiding surface in the shape of a figure of revolution concentric about said axis of rotation and terminating in an annular atomizing edge, and means including a source of high voltage connected to maintain said atomizing edge at an electrical potential different from its surroundings, feed means comprising nozzle means having an orifice diameter of a fraction of an inch located within a fraction of an inch of said liquid-guiding surface for feeding a stream of liquid material onto said liquid-guiding surface rearwardly of said atomizing edge for atomization therefrom, said nozzle means directing said stream generally parallel to and in the direction of rotation of said surface, and means for maintaining said nozzle means at an electrical potential of at least one kilovolt relative to said atomizing member to create an electrical attraction between liquid emerging from said nozzle means and the surface to which liquid is fed.

References Cited in the file of this patent

UNITED STATES PATENTS

| | | |
|---|---|---|
| 2,685,536 | Starkey | Aug. 3, 1954 |
| 2,926,106 | Gauthier | Feb. 23, 1960 |
| 2,961,581 | Grave | Nov. 22, 1960 |

FOREIGN PATENTS

| | | |
|---|---|---|
| 518,820 | Canada | Nov. 22, 1955 |
| 741,313 | Great Britain | Nov. 30, 1955 |
| 1,110,350 | France | Oct. 12, 1955 |